March 11, 1969   N. G. STALBERG ET AL   3,432,149
APPARATUS FOR STIRRING A LIQUID
Filed April 10, 1967
FIG.1
FIG.2
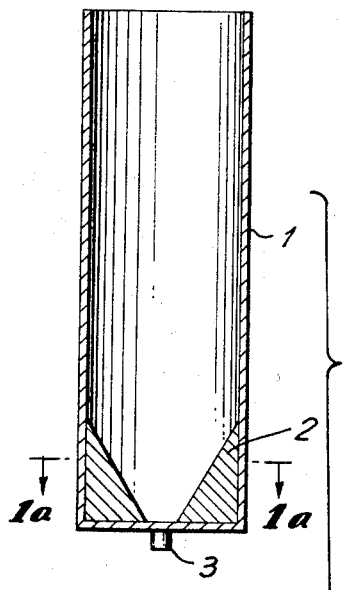
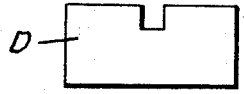
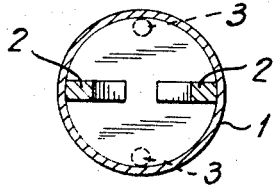
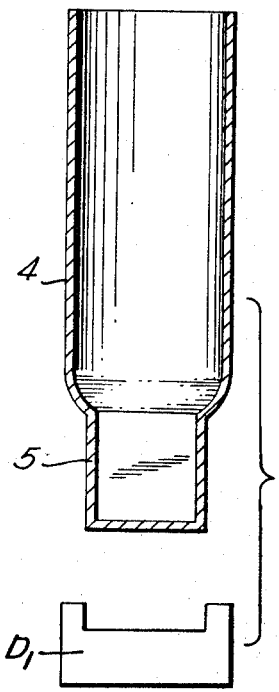
FIG.1a
FIG.2a

United States Patent Office 3,432,149
Patented Mar. 11, 1969

3,432,149
APPARATUS FOR STIRRING A LIQUID
Nils Gustav Stalberg, Sporrvagen 23, Jakobsberg, Sweden, and Erling Gotthard Berglund, Flygarvagen 29, Barkarby, Sweden
Filed Apr. 10, 1967, Ser. No. 629,575
Claims priority, application Sweden, Apr. 27, 1966, 5,739/66
U.S. Cl. 259—75
Int. Cl. B01f 11/00
8 Claims

ABSTRACT OF THE DISCLOSURE

Apparatus for stirring a liquid without the use of stirrers, the apparatus including an elongated vessel which is driven in rotation in alternate opposite directions, the vessel including internal triangular wings at the bottom thereof or having a noncircular shape at said bottom so as to exert dragging action on the liquid and produce circulation and mixing thereof.

*Brief summary of the invention*

The present invention relates to a vessel which enables the mixing of liquids without the use of a stirrer or similar external means. The invention also relates to a process for mixing liquids.

In many cases it is desirable to mix or stir liquids without the aid of a separate stirrer or agitator so as to avoid the risk of introduction of contaminants or foreign substances as well as the necessity to clean the stirrer or agitator. This is especially true in analysis of large series of samples in automatic analysis apparatus.

The invention is further described below with reference to a special embodiment of the vessel used in the mixing or stirring.

According to the present invention a tubular vessel is provided which at least for a major part of its height has a circular cross-section and which internally, preferably near the bottom of the vessel, is provided with means, e.g., in the form of radially located wings, which, when the vessel is rotated around its longitudinal axis, exerts a drag force on the liquid in the vessel so as to cause it to rotate. This dragging action exerted by the wings is, of course, pronounced in the neighborhood of the wings, whereas it is noticeable only after a period of rotation in those parts of the liquid which are located at a distance from the wings.

In a vessel according to the invention it is possible to achieve complete stirring or mixing of one or more liquids therein or to suspend solid particles in a liquid phase by rotating the vessel around its longitudinal axis at a relatively high speed alternatively in opposite directions. During this rotation, the wings rapidly cause a rotation of the part of the liquid present in the neighborhood of the wings, whereas the liquid present in the other part of the vessel, which is of a circular cross-section, on account of its inertia is caused to rotate at a later stage. The part of the liquid which is rotating more rapidly is caused to flow outwards against, and, depending on the location of the wings in the vessel, upwards and/or downwards along the walls of the vessel. In the center of the vessel a flow in the opposite direction is produced.

After a short period of time when all of the liquid present in the vessel has been brought to rotate with the vessel and, thus, the pumping effect of the wings has considerably decreased or disappeared, the direction of rotation is reversed so as to revive the pumping effect. In dependence of the dimensions of the vessel and the wings, the rotation speed, the viscosities of the treated liquids, etc. it is possible to adjust the rotation periods so as to cause a complete mixing of the liquid components present or introduced in the tubular vessel.

As was mentioned above, the invention has been described with a special reference to a vessel used for mixing or stirring. However, it is obvious that the present invention is not limited to a special form of the means which exerts the dragging action on a part of the liquid present in the vessel. The dragging action on the liquid caused by the above-mentioned radially located means in the form of wings when the vessel is rotated may also be achieved in other ways, e.g., by forming a part of the tubular vessel with a cross-section differing from a circle. Thus, a certain part of the height of the tube may be triangular, or rectangular in cross-section so as to give this part liquid-dragging properties. The use of a rectangular cross-section is especially suitable when it is desired to perform optical measurements or determinations on the liquid present in the vessel. The rectangular form offers the further advantage that measurements may be made on liquid layers of two different thicknesses. For such use the vessel is manufactured from transparent materials, such as glass or a plastic, e.g., polystyrene.

From the above, it is to be understood that a certain part of the height of the vessel according to the invention shall exert a liquid-dragging effect when the vessel is rotated around its longitudinal axis. As has been mentioned this may be achieved in any desired manner, e.g., by arranging within the vessel, radially located wings or by giving the vessel for a certain part of its height a noncircular cross-section. The height of the liquid-dragging part of the vessel is at the most half of the intended liquid level, suitably no more than one-third thereof and preferably about one-fourth thereof.

When the entire height of the vessel has a circular cross-section, i.e., when liquid-dragging means in the form of wings are used, the rotation is facilitated by the arrangement of external means, preferably at the bottom of the vessel, which are acted upon by a rotating device. The invention is not limited to a special type of the said external means; they may, e.g., have the form of a ridge or edge running across the bottom of the vessel, or the form of two or more lugs. When the vessel, for a certain part of its height, has a noncircular cross-section, this portion itself may be used for engagement by the rotating device.

In agreement with the above, the present invention also relates to a process for mixing liquids or for suspension or dissolution of solid particles in a liquid phase. The mixing process according to the invention is characterized by introducing the liquid to be mixed or stirred in a vessel which at least for a major part of its height is cylindrical and which either is provided internally with radially located means, e.g., in the form of wings, or has a cross-section which for a part of the height of the vessel is noncircular, e.g., triangular or rectangular in cross-section, which, when the vessel is rotated around its longitudinal axis, exerts a dragging action on the liquid, the vessel being driven in rotation around its axis periodically in opposite directions.

*Brief descripiton of the drawing*

FIGURE 1 is a longitudinal cross-section through a first embodiment of a vessel according to the invention;

FIGURE 1a is a cross-sectional view taken along line 1a—1a in FIG. 1;

FIGURE 2 is a longitudinal cross-section through a second embodiment of a vessel according to the invention; and FIGURE 2a is a view from below of the vessel of FIG. 2.

*Detailed description of the invention*

In the drawing there is shown in FIG. 1 an elongated, cylindrical vessel 1 having an open top adapted for receiving a liquid. At the lower portion of the vessel are provided two internal wings 2 of triangular shape. The wings 2 are diametrically opposed and extend radially from the vertical wall of the vessel inwardly towards the center. The wings 2 each form an angle between the side wall of the vessel and its bottom. Two pins 3 project downwardly from the bottom of the vessel and are engageable by a drive means D to effect rotation of the vessel.

The shape of the wings has been specifically developed in a manner to facilitate liquid mixing within the vessel as will be described hereinafter. In particular, the hypotenuses of the wings are spaced from one another at the bottom of the vessel and they face inwardly and are inclined upwardly and outwardly. When the vessel is rotated, the wings exert a rotation force on the liquid at the lower portion of the vessel tending to cause this liquid to rotate together with the vessel. Because of the triangular shape of the wings a relatively large torque is developed on the liquid tending to make it rotate against the action of its own inertia. At the onset of rotation, the liquid at the lower portion of the vessel is caused to rotate by the radial wings, whereas the liquid in the upper portion of the vessel tends to remain stationary. Upon continued rotation of the vessel the entire liquid mass tends to undergo rotation. However, before the liquid mass has reached this uniform rotation, the direction of rotation of the vessel 1 is reversed. Thereby the wings exert forces on the liquid in the lower portion of the vessel, tending to rotate the liquid in opposite direction with the vessel. The liquid in the upper portion of the vessel then tends to rotate in the same direction, slowing down by inertia, and a circulation and mixing effect is produced in the vessel. As a consequence, the liquid undergoes a thorough and vigorous mixing as the vessel is subjected to alternate rotation in opposite directions.

In order to achieve this mixing, it is required that the wings extend to a height of less than one-half the liquid height. Therefore, the wings must have a height of less than one-half that of the vessel. It has been found most efficient if the wings are about one-fourth of the height of the vessel.

In FIG. 2 there is shown a vessel having an upper portion 4 of circular cross-section and a lower portion 5 of rectangular cross-section. By virtue of this arrangement, rotation of the vessel in opposite directions will result in the application of forces on the liquid in the lower portion of the vessel by the flat faces thereof, tending to drive the liquid in rotation. In contrast, the circular wall of the upper portion 4 produces little effect on the rotation of the liquid within the vessel. As with the wings in the embodiment of FIG. 1, it has been found necessary that the height of the portion 5 be less than one-half of the height of the liquid in the vessel. Preferably, the height of portion 5 is one-quarter the height of the vessel.

The embodiment in FIG. 2 offers the advantage that the interior of the vessel is free of internal projections, or the like, such as the wings 2, and thereby there is no possibility of clogging or retention of solids in the vessel. Moreover, the portion 5 can be directly engaged by drive means $D_1$ to effect rotation of the vessel and the need for depending lugs such as 3 can be avoided. The vessel of FIG. 2 is subjected to alternate rotation in opposite directions in the same manner as described hereinabove for the vessel of FIG. 1.

For one-time use the vessel according to the invention is suitably manufactured by extrusion from a plastic material such as a styrene plastic. Moreover, the vessel may be made transparent to enable viewing the liquids as they are being mixed.

The vessels according to the invention have numerous uses. For example, they are especially effective in a photometer in which a reagent is automatically dispensed and admixed with a sample prior to the photometrical evaluation. The vessel may also be used in an apparatus solely intended for dispensing and admixing.

For use in the photometer there have been employed vessels having a volume of 3.6 cubic centimeters in which the mixing time has been 2.5 seconds, subdivided in five rotation periods of equal length in alternate opposite directions. The rotation speed of the vessel is 2,000 r.p.m.

Vessels of the above type have been found particularly effective in mixing blood serum with liquid reagents of the consistency of water. The blood serum is generally in the amount of between 3.2 and 3.5 cubic centimeters and the liquid reagent is between 0.1 and 0.2 cubic centimeter.

Although the invention has been described hereinabove in detail with reference to two specific embodiments, it will become apparent that numerous variations and modifications of the disclosed embodiments will be evident to those skilled in the art without departing from the scope and spirit of the invention if defined by the attached claims.

What we claim is:

1. Apparatus for stirring a liquid comprising an elongated cylindrical vessel supported for rotation about a vertical axis, means for periodically driving the vessel at high speed rotation in alternate opposite directions at short intervals, said vessel having an open top and being adapted for receiving a liquid to be stirred, and means at the lower portion of the vessel and integral therewith for exerting force on the liquid in the vessel in said lower portion to induce vigorous stirring of said liquid as the vessel rotates, said means including radial wings at said lower portion extending about one-fourth of the height of the vessel.

2. Apparatus as claimed in claim 1 wherein said wings are two in number and are diametrically opposed, said wings being triangular and having hypotenuses which face inwardly in the vessel and are inclined upwardly and outwardly, said wings being closest to one another at the lowest end of their hypotenuses which are in spaced relation.

3. Apparatus as claimed in claim 2 comprising a pair of depending external lugs on the lower portion of said vessel at the periphery thereof for being driven to in turn drive the vessel.

4. Apparatus as claimed in claim 1 wherein said vessel is constiuted of transparent material for use in a photometer.

5. Apparatus for stirring a liquid comprising an elongated vessel supported for rotation about a vertical axis and driven periodically in alternate opposite directions, said vessel having an open top and being adapted for receiving a liquid to be stirred, said vessel including a cylindrical upper portion and a non-circular lower portion of substantially less height than the cylindrical portion and reduced cross-sectional area for exerting force on the liquid at the bottom of the vessel to induce vigorous stirring of the liquid as the vessel rotates.

6. Apparatus as claimed in claim 5 wherein said lower portion of the vessel is polygonal in cross-section.

7. Apparatus as claimed in claim 6 wherein said vessel is constituted of transparent material for use in a photometer.

8. Apparatus as claimed in claim 7 wherein the vessel is driven at a speed of 2000 r.p.m. in opposite directions at time intervals of 2.5 seconds.

References Cited

UNITED STATES PATENTS

| | | | |
|---|---|---|---|
| 768,956 | 8/1904 | Smithley | 259—75 |
| 1,754,951 | 4/1930 | Hollier | 259—75 X |
| 2,504,862 | 4/1950 | Mitchell | 259—75 |
| 2,516,655 | 7/1950 | Smith | 259—75 X |
| 3,224,742 | 12/1965 | Hiser | 259—75 |

ROBERT W. JENKINS, *Primary Examiner.*